United States Patent [19]

Hung et al.

[11] Patent Number: 4,849,846
[45] Date of Patent: Jul. 18, 1989

[54] TELEPHONE PROTECTION CIRCUIT

[75] Inventors: Francis Y. Hung, Kanata; Donald S. McGinn, Almonte, both of Canada

[73] Assignee: Northern Telecom Limited, Montreal, Canada

[21] Appl. No.: 285,076

[22] Filed: Dec. 16, 1988

[51] Int. Cl.$^4$ .......................... H02H 9/04; H02H 9/02
[52] U.S. Cl. ........................................ 361/56; 361/57; 361/91; 361/111; 361/93; 379/412
[58] Field of Search ....................... 361/54, 55, 56, 57, 361/79, 86, 87, 88, 91, 111, 117, 118, 119; 379/331, 412

[56] References Cited

U.S. PATENT DOCUMENTS

| | | | |
|---|---|---|---|
| 3,600,634 | 8/1971 | Muench, Jr. | 361/111 |
| 3,790,856 | 2/1974 | Hutchinson | 361/91 |
| 3,878,434 | 4/1975 | Voorhoeve | 361/93 |
| 4,079,211 | 3/1978 | Janssen | 361/56 |
| 4,099,216 | 7/1978 | Weberg | 361/56 |
| 4,322,767 | 3/1982 | El Hamamsy et al. | 361/111 |
| 4,377,832 | 3/1983 | Toney et al. | 361/56 |
| 4,484,244 | 11/1984 | Avery | 361/111 |
| 4,661,878 | 4/1987 | Brown et al. | 361/56 |
| 4,713,719 | 12/1987 | Kugelman | 361/54 |
| 4,758,420 | 7/1988 | McCartney | 361/91 |

Primary Examiner—A. D. Pellinen
Assistant Examiner—Howard L. Williams
Attorney, Agent, or Firm—Philip W. Jones

[57] ABSTRACT

A circuit for protecting sensitive telephone equipment from voltage or current overloads on the TIP or RING line includes a resistor serially positioned in the line and a triac triggered by a voltage differential across the resistor. A pair of fast diodes is positioned on the line adjacent to the telephone equipment for momentarily clamping the voltage on the line at that point between ground and the voltage supply of the equipment. The mementary clamping of the voltage creates the voltage differential across the resistor which triggers the triac. The fast diodes are capable of passing current for a time sufficient to allow the triac to begin shunting current to ground. An enhanced form of the protection circuit includes a second pair of diodes extending in parallel with the fast pair of diodes and positioned on the line between the pair of fast diodes and the triac. Inclusion of the second pair of diodes allows the circuit to utilize a triac with a slower turn-on time and a higher on-state voltage.

15 Claims, 6 Drawing Sheets

TELEPHONE PROTECTION CIRCUIT

The invention relates to a circuit for protecting sensitive equipment from voltage and/or current overloads, and more particularly, to a protection circuit for preventing such overloads from damaging a telephone subscriber line interface circuit (SLIC).

SLICs in telephone networks require protection from voltage or current surges created by lightning or power-related faults. The lightning faults could be due to a direct or indirect strike to a telephone cable, or due to a ground potential rise (GPR) from a strike to a nearby grounding structure. A GPR may cause a voltage surge in the telephone central office. The power-related faults are generally due to powerline crosses and phase imbalance causing excessive induced alternating currents. A first level of overvoltage protection is usually provided at the point where outside cables enter a building; the voltage able to pass that first level of protection is generally specified not to be in excess of 1,000 volts (peak-to-peak). However, 1,000 volts is usually above the voltage that integrated circuits (ICs) in the SLIC can handle. As the ICs in the SLIC become more sophisticated and sensitive, there is a need to provide a better protection circuit for the high-performance devices in the SLIC. It is also desirable for the protection circuit to provide full protection to the SLIC under all common fault conditions, but not to interfere with the normal operation of the SLIC.

The second type of overvoltage problem that can occur with an SLIC is a simultaneous surge to a group of line circuits. During such surges the common ground return current can cause an excessive voltage drop on the battery rail. This overvoltage can exceed a hundred volts beyond the battery voltage on the line circuit, and can result in a failure of all of the ICs on the SLIC.

Many protection arrangements have been proposed. For example, in U.S. Pat. No. 4,661,979 a transorb is used to conduct positive currents to ground and to absorb the negative overvoltage energy in the zener mode. Such a device is acceptable for lightning pulses of short duration but not for power-related faults of longer duration, e.g. 1 cycle of 60-Hz. energy. Another disadvantage of the transorb is the dynamic clamping ratio of the device. As the transorb starts to break down and the surge current starts to increase, the clamping voltage of the transorb increases as a function of the surge current. As a result, the peak clamping voltage may be in the order of 30 per cent greater than the initial breakdown voltage of the transorb. Such a momentary surge may not cause any instantaneous breakdown of ICs, but may nevertheless result in degradation.

Another protection arrangement is described in I.E.E.E. Journal of Solid-State Circuits; Vol. SC-21, No. 6; December, 1986; pages 947–955. In the protection arrangement described in that article, each of the tip and ring lines of a subscriber loop is guarded by a silicon controlled rectifier (SCR). The gate of each SCR is connected through a respective diode to the negative battery voltage and through a respective resistor to the tip or ring line. If either the tip or ring line receives a negative voltage surge, current begins to pass through the respective diode and resistor; the voltage drop across the respective resistor is sufficient to turn on the associated SCR. A further diode is connected to each of the tip and ring lines for conducting positive currents to ground.

There are a number of disadvantages to the described circuit. Assuming the use of silicon diodes with a typical voltage drop of 0.6 to 1.0 volts, a voltage approximately 1.8 volts below battery voltage is required on the tip or ring line before the respective SCR will turn on. The diode turn-on time, which is related to the diode construction, and the surge current value can both have a significant effect on the forward voltage drop during a fast transient. These factors can easily translate into 10 volts or more peak voltages on a typical diode (such as the 1N4001 type). Before the respective SCR fully turns on, the SLIC may have been exposed to tens of volts beyond its normal operating range. The described circuit also requires a special SCR, one having a holding current above the current that the SLIC can deliver under the short circuit condition. Also, this custom SCR is not sufficiently flexible to allow it to be used in a positive battery supply circuit, the type of circuit commonly used in pay phone applications. Another drawback of the described circuit is that it does not resolve the excessive voltage drop due to large ground return currents during the simultaneous surge to a group of line circuits, as described above.

Accordingly, it is an object of this invention to provide an improved protection arrangement for a SLIC.

One form of the fault protection circuit of the invention utilizes a resistance element, a voltage clamping means and a triac means. One end of the resistance element is connected to an interface circuit to be protected, and the other end is connected to the line. The one end of the resistance element is clamped by a voltage clamping means to a voltage between a first voltage and a second voltage, the first voltage being at a higher potential than the second voltage. The two voltages are normally the two supply voltages of the interface circuit. A gate and a first terminal of the triac means are each connected to a respective different end of the resistance element, and a second terminal of the triac means is connected to the second voltage. The voltage clamping means is sufficiently fast acting to clamp a surge propagating through the resistance element to either the first or second voltage before the surge can adversely affect the interface circuit. The triac means is sufficiently fast acting that a voltage differential created by the passage of the surge through the resistance element places the triac means into a conducting state for shunting the surge before the surge can adversely affect the voltage clamping means.

The voltage clamping means may be a pair of high speed diodes. One of the diodes extends between the one end of the resistance element and the first voltage. The other diode extends between the one end of the resistance element and the second voltage. The triac means is a structure having its gate connected to the one end of the resistance element, and its first terminal connected to the other end. The fault protection circuit may also comprise an additional resistance element extending serially with the previously-mentioned resistance element and utilized for limiting line current. The additional resistance element is always required on the tip and ring lines of a two-wire telephone subscriber loop, but may either remain separate from the protection circuit of this invention or be included in such circuit.

A further form of the fault protection circuit of the invention utilizes a pair of second diodes as well as the pair of high speed diodes for voltage clamping. Each one of the pair of second diodes extends in parallel with a respective one of the pair of high speed diodes. The pair of second diodes have a slower turn-on time than the pair of high speed diodes, and their inclusion in the circuit allows a triac structure with a slower turn-on time to be utilized. The pair of high speed diodes creates a similar rapid clamping effect to that in the first form of the invention. However, the second pair of diodes compensate for a slower reacting triac structure than in the first form of the invention. Although the second pair of diodes have a slower reaction time than the pair of high speed diodes, they have a faster reaction time than the thyristor structure used in this form of the invention. The pair of second diodes have to be sufficiently fast acting that they can clamp a surge propagating through the first resistance element to either the first or second voltage before the surge can adversely affect the high speed diodes. The triac structure in this form of the invention need only be sufficiently fast acting that a voltage differential created by the surge across the first resistance element places the triac structure into a conducting state for shunting the surge before the surge can adversely affect the second pair of diodes. The further form of fault protection circuit may utilize a second resistance element, the first end of that element being connected to the interface circuit and the second end being connected to the first resistance element. The pair of high speed diodes are connected to the first end of the second resistance element, and the pair of second diodes are connected to the second end of that element. This further form of the fault protection circuit may also include an additional resistance element for limiting line current, as was previously discussed.

Each of the high speed diodes may have a typical forward recovery time of approximately 4 nanoseconds, and each of the second pair of diodes may have a typical forward recovery time of approximately 1 microsecond. The triac structure may have a typical holding current and gate trigger current of approximately 5 milliamperes. The resistance element used in the first form of the invention and the pair of resistance elements used in the second form of the invention may each have a resistance of approximately 3 ohms. The additional resistance element for limiting line current may have a resistance of between approximately 50 and 200 ohms.

The first and second voltages are normally the supply voltages required by the interface circuit, which in the case of a SLIC are nominally −48 volts supplied by a battery and ground voltage. In the case of a SLIC, the line to which the protection circuit is connected is the tip or ring line of a telephone subscriber loop.

The invention will next be described in terms of two preferred embodiments utilizing the accompanying drawings, in which.

Figure 1:
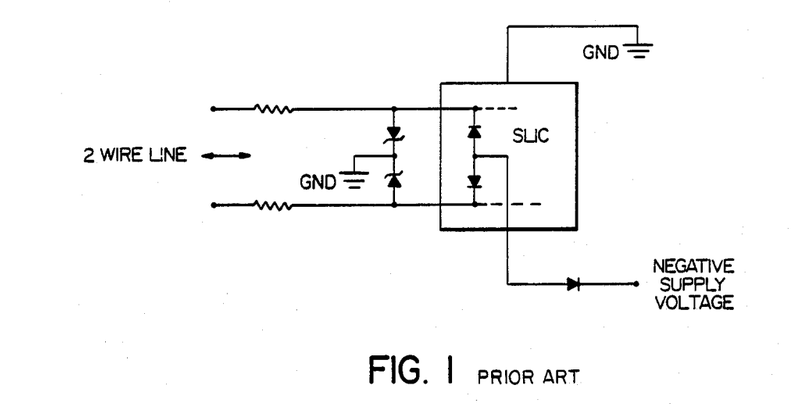
FIG. 1 illustrates a first prior art protection circuit for preventing damage to a SLIC.

The protection circuit illustrated in FIG. 1 is the circuit of U.S. Pat. No. 4,661,979. The disadvantages of this protection circuit have been previously discussed.

Figure 2:
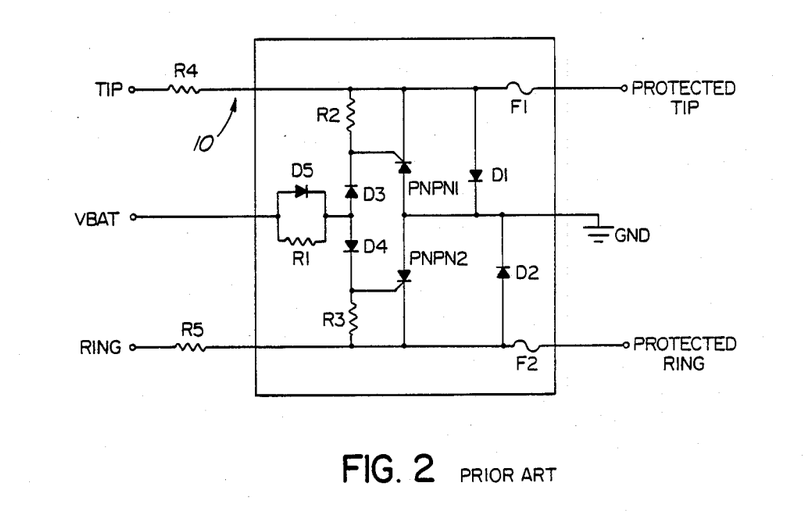
FIG. 2 illustrates a second prior art protection circuit for preventing damage to a SLIC.

The protection circuit illustrated in FIG. 2 is the circuit described in the I.E.E.E. Journal of Solid-State Circuits article mentioned previously. The article describes the operation of this protection circuit in the following way. If lightning, a powerline, or other high power contact forces the voltage on TIP input 10 more to be more negative than battery voltage $V_{BAT}$, current flows through diodes D5 and D3. When that current is between 150 mA. and 300 mA., the voltage across resistor R2 is sufficient to trigger thyristor PNPN1, which shunts the current pulse to ground. Thyristor PNPN1 turns off when the current through it drops to between 125 mA. and 250 mA., and the protection circuit returns to dormant operation. If the voltage on TIP input 10 becomes more positive than ground, the diode D1 conducts the current to ground. Similar components act on the RING line in the same manner. Diode D5 protects $V_{BAT}$ from power supply shorts which may result if the protection circuit, the SLIC, or one of the current-limiting resistors R1 and R2 fails. With the inclusion of diode D5, $V_{BAT}$ can no longer bias the substrate under normal conditions, and resistor R1 is in parallel with diode D5 for substrate biasing. F1 and F2 designate fuses which limit the amount of fault current.

As mentioned previously, this prior art protection circuit has disadvantages in terms of the voltage required to turn it on and in terms of its response time to a fast transient, for instance, a 10×1000 10-ampere waveform. Thyristor PNPN1 will not turn on until the external fault voltage sensed at TIP input 10 is below $V_{BAT}$-$V_{D5}$-$V_{D3}$-$V_{BE(PNPN1)}$, which means assuming use of silicon diodes that the fault voltage is at least 1.8 volts below $V_{BAT}$. The turn-on time and the dynamic impedance of diodes D3 and D5, and the base-emitter junction area of PNPN1 will have a significant effect on the forward voltage drop. This can easily translate into 10 volts or more peak before the thyristors fully turn on, equating to several microseconds of delay within which sensitive SLIC equipment can be damaged. The thyristors PNPN1 and PNPN2 are necessarily of special design since a high holding current is required, ie. a holding current above the current that the SLIC can deliver under short-circuit conditions; off-the-shelf thyristors would normally be excluded. Other limitations on this circuit are that it does not provide overvoltage protection to the solid-state relay which is used to switch the line circuit from the ringing mode to the talk mode, and it does not provide protection against excessive voltage drops produced by large ground return currents.

Figure 3:
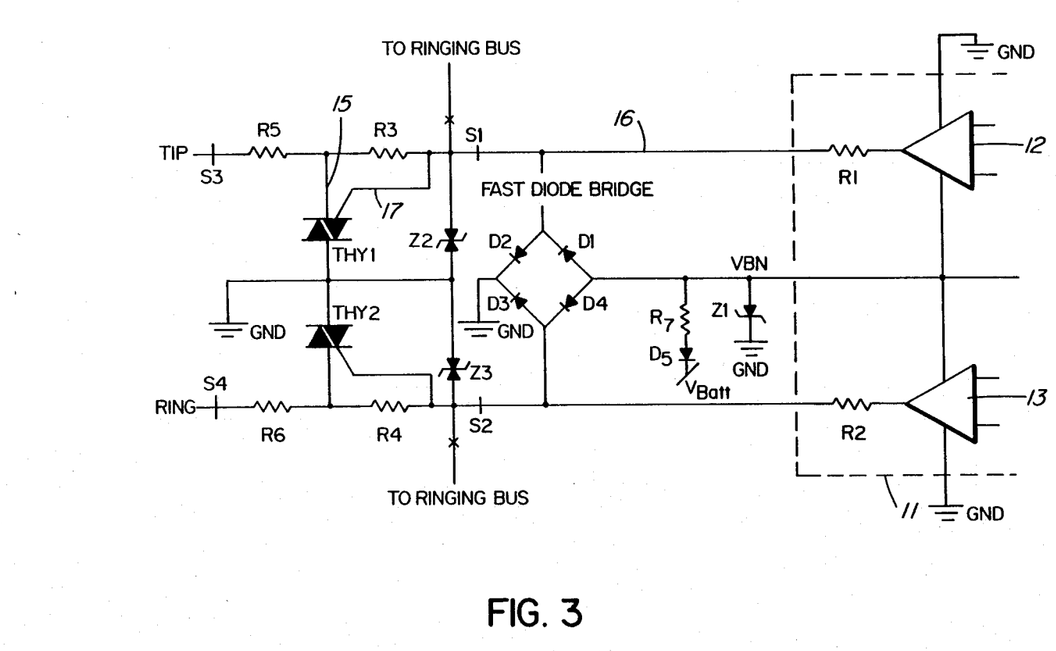
FIG. 3 illustrates a first preferred embodiment of the protection circuit of the invention.
Figure 4:
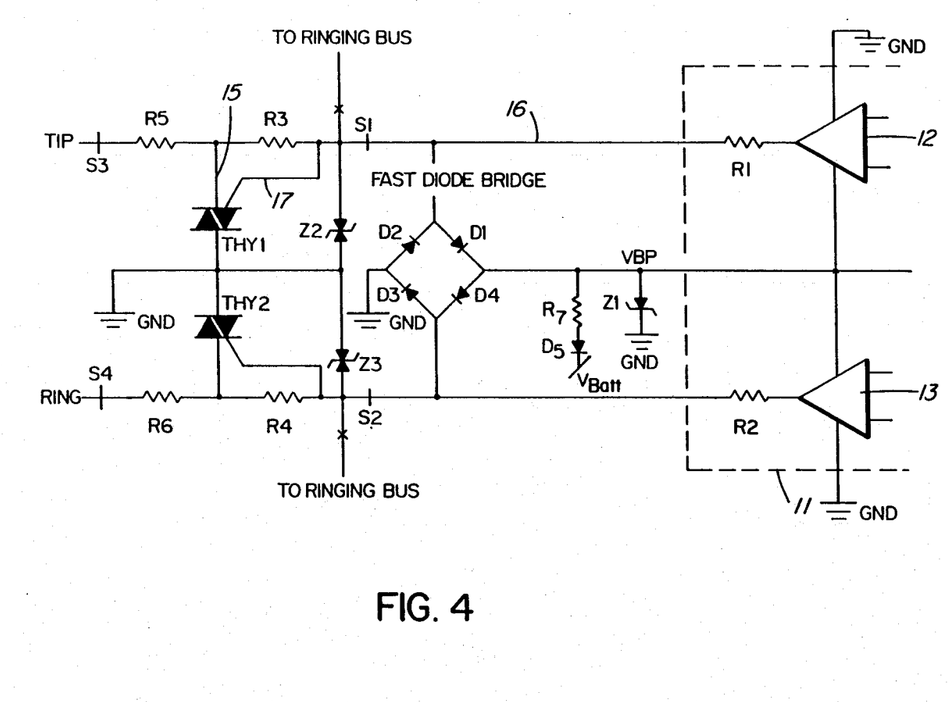
FIG. 4 illustrates the same embodiment of the protection circuit as in FIG. 2, except for the utilization of different supply voltage polarity.

A first preferred embodiment of the protection circuit of the invention is shown in FIGS. 3 and 4. The circuits differ only in that the power supplies are reversed, with corresponding reversal of the diodes D1, D2, D3 and D4. VBP and VBN represent voltage supplies. In FIG. 3 GND is ground voltage and VBN is −48 volts, while in FIG. 4 GND is ground voltage and VBP is +48 volts. Diodes D1 to D4 are low-current, high-speed diodes with a typical forward recovery time of 4 nanoseconds; the 1N4148-type diode is one that meets this requirement. A pair of triacs THY1 and THY2 are utilized; each triac may be triggered by either positive or negative gate current. The effective operation of this circuit requires that each of the triacs THY1 and THY2 have a typical forward recovery time of the order of less than 1 microsecond, and a gate sensitivity of the order of 10 milliamperes; such devices are now available as off-the-shelf components. Resistors R3 and R4 are for current threshold control, each having a typical value of 3 ohms for 200 mA. level threshold. Resistors R5 and R6 each have a typical value of 100 ohms. As previously mentioned, R5 and R6 are required on all two-wire subscriber loop lines to provide line feed impedance and for limiting current, and although those resistors may not be incorporated into the protection circuit of this invention they would nevertheless still be present. S1 and S2 each designates a relay which controls the ringing of the circuit. S3 and S4 each designates a relay which opens whenever a sustained voltage or current overload is sensed on the TIP or RING lines. The circuitry for controlling the relays S1 to S4 is not shown. D5 is a standard low-current diode; the 1N4001 type is quite adequate for this application. Z1 is a low-power transorb; it is designed to clamp the voltage at a point close to maximum voltage of the battery.

The broken line 11 designates the boundary of the linefeed drivers being protected. Operational amplifier 12 drives the TIP line, and operational amplifier 13 drives the RING line. Op amps 12 and 13 are sensitive to any voltage or current changes imposed on their outputs. As partial protection, resistors R1 and R2 are positioned serially in the respective outputs of op-amps 12 and 13. For good signal transmission, e.g. limited voltage drop, resistors R1 and R2 must each necessarily have a small value; in this case they each have a resistance of 5 ohms.

The operation of the protection circuit connected to the TIP line of FIG. 3 will next be described; the protection circuit connected to the RING line operates in a similar fashion. Subject to the differences required by voltage polarity reversal, the comments are also applicable to the operation of the circuit of FIG. 4. If a foreign voltage on the first terminal 15 of triac THY1 is a positive one-diode drop above GND, diode D2 acts to clamp the voltage to ground. Resistor R5 may have a typical value of 100 ohms, and resistor R3 may have a resistance of 3 ohms. Resistor R3 controls the threshold of the triggering of the triac THY1. If the surge current reaches a level sufficient to create a 0.6-volt drop across resistor R3, the triac THY1 will start conducting and shunt the harmful currents to ground. At the point where triac THY1 is triggered, the voltage drop between terminal 15 and ground is in the order of 1 to 3 volts which limits the current flowing into the diodes D1 to D4. The voltage drop at node 16 will be approximately 1 diode drop above ground.

If the foreign voltage is of a negative nature and greater than one diode voltage drop below the battery voltage, diode D1 starts conducting and clamps the op-amp output on node 16 to the op-amp supply rail VBN. Diode D5 blocks current from flowing into the battery supply ($V_{Batt}$), and that blocking action causes the voltage on VBN to rise. Once the overvoltage on VBN rises above the zener voltage of the transorb Z1, current passes through R5 and R3 in the opposite direction, as in the case of a positive current surge. The remaining action of the protection circuit is similar to that described in the previous paragraph. Triac THY1 is triggered in the first quadrant during a negative current surge, the gate 17 and the second terminal of the triac being positive with respect to the first terminal 15.

A typical triac will have a non-triggered threshold voltage ramp rating of 20 volts per microsecond. This value is sufficient to prevent false triggering of the triac by a high slew rate on the op-amp. On the other hand, the triac can easily be triggered by a voltage ramp exceeding 50 volts per microsecond. This property is used to advantage in the circuit to protect against fast transients. The triac is triggered prior to the diode bridge by a fast voltage ramp of either polarity. This provides an improved performance on a fast lightning impulse, and electrode static discharge (ESD) protection. The concern for the diode turn-on time and the reaction time of the transorb are removed by this design.

As mentioned, diode D5 prevents negative surge current from entering the battery supply. Without the presence of this blocking diode, negative current from many $LICs could add to such a large value that the fuse in the battery supply circuit might blow and place the line circuit out of service. Low-power transorb Z1 is used to clamp the surge voltage to prevent damage to the ICs. It also acts to control overvoltage on the battery supply, which may for example be due to large ground return currents or inductive transients on the central office battery. Resistor R7, which has a value in the order of a few ohms, serves to equalize the current among different transorbs in the SLICs. Under catastrophic failure conditions, resistor R7 can provide ultimate protection by acting as a fuse. The presence of this resistor prevents the main fuse of the battery supply from operation due to a problem in one defective line circuit.

A triac has a typical holding current in the order of 5 milliamperes, and would have difficulty returning to the normal blocking mode after a surge is over. This is due to the fact that a typical SLIC can source or sink more than the holding current of the triac. However, when the triac is in its conduction mode there is virtually no limiting resistance (only a few ohms) in the current path, and it can be assumed that the current driver sinking or sourcing this current will saturate. This saturation condition is relatively easy to detect, and such condition can be used to signal the relays S1 and S2 to switch, creating an interruption in the supply of the holding current which returns the triacs to their dormant current blocking mode.

Figure 5:
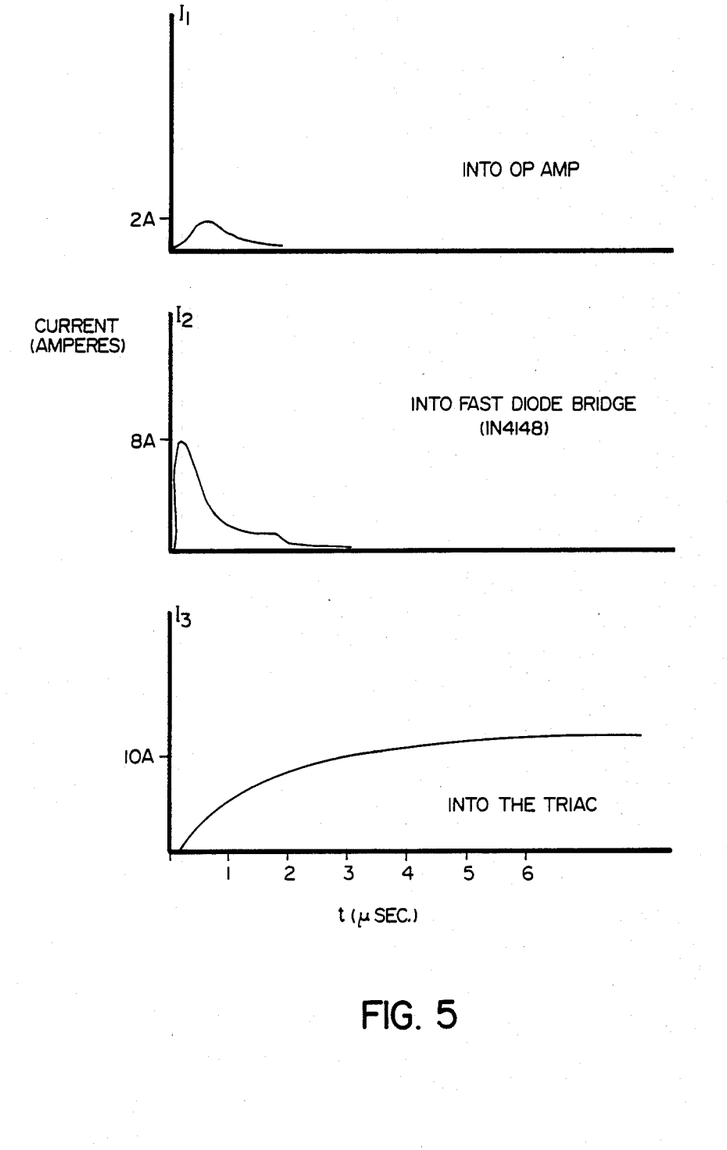
FIG. 5 is a schematic illustration of the current levels experienced by each of three components in the first preferred embodiment of the protection circuit after exposure of that circuit to a test power surge.

FIG. 5 is a schematic representation of the change of current with time at three selected points on the circuit of FIG. 3. These current profiles, which are reproductions of oscilloscope traces obtained from tests, illustrate the current entering (a) the operational amplifier at the output of the SLIC, (b) the 1N4148 fast diode bridge, and (c) the triac. A 10×1000 10-ampere test surge was used in obtaining the current profiles. Due to the presence of the protection circuit, the current entering the output end of the operational amplifier was limited to below 2 amperes. FIG. 5 illustrates that the current through the fast diode bridge rose to approximaely 8 amperes in only a matter of nanoseconds. The triac THY1 began conducting after approximately 100 nanoseconds, and the current into the fast diode bridge then began to decrease.

Figure 6:
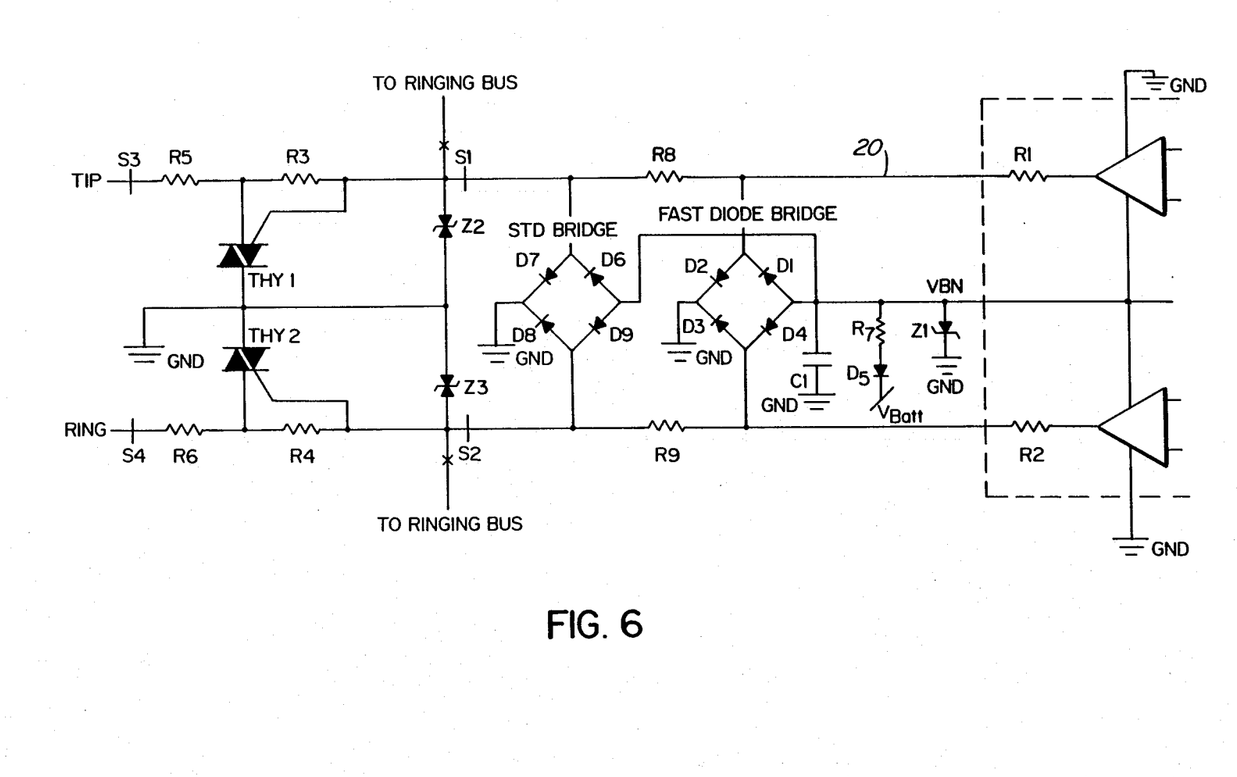
FIG. 6 illustrates a second preferred embodiment of the protection circuit of the invention.
Figure 7:
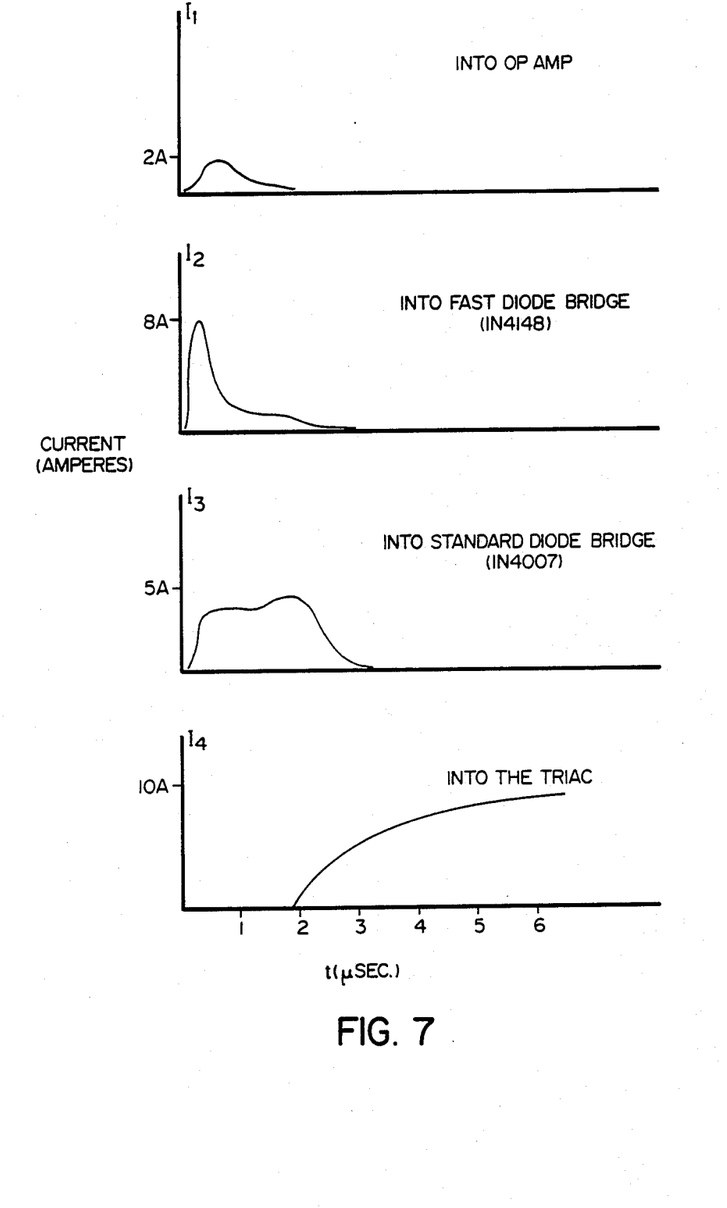
FIG. 7 is a schematic illustration of the current levels experienced by each of four components in the second preferred embodiment of the protection circuit after exposure of that circuit to a test power surge.

The second preferred embodiment of the protection circuit of the invention is illustrated by FIGS. 6 and 7. FIG. 6 is a circuit diagram, and FIG. 7 is a schematic representation of four current versus time profiles obtained at selected points on the circuit of FIG. 6. The second embodiment differs from the first embodiment by the inclusion of a diode bridge consisting of four standard low voltage diodes D6, D7, D8 and D9, and two additional resistors R8 and R9. The diodes D6 to D9 each have a sufficiently high reverse breakdown voltage to support the maximum battery voltage of −48 volts. They also have a typical forward recovery time in the order of one microsecond. One type of diode suitable for this purpose is the 1N4001 type.

Assuming the presence of a negative voltage surge on the TIP line of FIG. 6, the second embodiment operates in the following way. The voltage is clamped initially by diode D1 at the output 20 of the SLIC circuit to approximately one diode drop below battery voltage, ie. −48.6 volts. As the current passing through diode D1 increases, voltage differentials grow across each of the resistors R5, R3 and R8. The voltage differential across resistor R8 forces diode D5 into conduction. The response time of diode D6 is considerably slower than the four nanoseconds of diode D1, but is sufficiently fast that relief is provided to diode D1 before high current flow can damage it. Diode D6 in turn requires relief from high current flow if it is to avoid damage, and triac THY1 provides that relief. The presence of diode D6 allows the use of a more slowly responding, and thus cheaper, triac than was used in the first embodiment; the response time of triac THY1 in the second embodiment may be as high as several microseconds. As in the first embodiment, triac THY1 is turned on by the voltage differential created across the resistor R3. A positive voltage on the TIP input causes a corresponding action. In that case, diode D2 initially clamps the positive voltage to ground voltage, then current flow through resistor R8 causes diode D7 to begin conduction, and then triac THY1 is triggered by current flow through resistor R3. The protection circuit comprises a corresponding set of components for handling negative or positive voltage surges on the RING input.

The presence of capacitor C1 improves the fast surge performance of the triac. C1 is the type of capacitor usually employed for decoupling, having a value in the order of 0.1 microfarads; it provides a virtual ground for fast pulses. The arrangement will ensure that triac THY1 will turn on for voltage ramps above a certain value, due to the generated current (C)(dV/dt).

In the embodiments of FIGS. 3, 4 and 5, a pair of bipolar zener diodes Z2 and Z3 are shown. Z2 is positioned between the TIP line and ground, and Z3 is positioned between the RING line and ground. Z2 or Z3 turns on whenever the voltage differential across it exceeds approximately 250 volts, ie. whenever the TIP line or RING line exceeds +250 volts or −250 volts. Solid-state relays S1 and S2 can alternately connect either the SLIC or the telephone ringing circuitry to the TIP and RING lines. The purpose of Z2 and Z3 is to protect the solid-state relays. When a voltage surge occurs on the TIP or RING line, Z2 or Z3 respectively momentarily clamps the voltage to less than 250 volts until triac THY1 or triac THY2 respectively can turnon to shunt the surge to ground. Z2 and Z3 thus serve a similar protective function for the solid-state relays as that served by the diode bridge(s) for the SLIC.

Once a surge on the TIP or RING lines has been shunted, the triac THY1 or THY2 can be reset in one of several ways. The SLIC can be programmed to sense when the drivers are saturated during the shunting of the triacs, and to momentarily open the relays S1 and S2 to remove current from the line to reset the triacs. Alternately, the triacs THY1 and THY2 can be designed with a high holding current; such triacs will automatically turn off when the fault current drops below the holding current of the triac. The triac will also turn off after the surge and the ringing current drops below the holding current. This will occur during the zero crossing of the ringing current.

The protection circuits that have been described may be integrated into monolithic silicon devices.

We claim:

1. A fault protection circuit adapted to be positioned between a line and an interface circuit for preventing voltage or current surges on the line from adversely affecting the interface circuit, the fault protection circuit comprising:
    (a) a resistance element, one end of the resistance element being connected to the interface circuit and the other end being connected to the line;
    (b) a voltage clamping means for clamping the one end of the resistance element to a voltage between a first voltage and a second voltage, the first voltage being at a higher potential than the second voltage; and,
    (c) a triac means having first and second terminals and a gate, the first terminal and gate each being connected to a different end of the resistance element, the second terminal being maintained at the second voltage;

whereby the voltage clamping means is sufficiently fast acting to clamp a surge propagating through the resistance element to either the first or second voltage before the surge can adversely affect the interface circuit, and whereby the triac means is sufficiently fast acting that a voltage differential created by the passage of the surge through the resistance element places the triac means into a conducting state for shunting the surge before the surge can adversely affect the voltage clamping means.

2. A fault protection circuit as in claim 1, and also comprising an additional resistance element serially connected between the resistance element and the line.

3. A fault protection circuit as in claim 1, wherein the voltage clamping means is a bipolar zener diode means, and wherein the interface circuit is a ringing signal circuit for creating an alternating current on the line for driving the ringing circuit on a telephone.

4. A fault protection circuit as in claim 3, wherein the bipolar zener diode means is comprised of a pair of zener diodes, the anode of each zener diode being connected to the anode of the other.

5. A fault protection circuit as in claim 3, wherein the first voltage is approximately equal to +250 volts and the second voltage is approximately equal to −250 volts.

6. A fault protection circuit adapted to be positioned between a line and an interface circuit for preventing voltage or current surges on the line from adversely affecting the interface circuit, the fault protection circuit comprising:
    (a) a first resistance element, one end of that resistance element being connected to the interface circuit and the other end being connected to the line;
    (b) a pair of high speed diodes, one of the diodes extending between the one end of the first resistance element and a first voltage, the other diode extending between the one end of the resistance element and a second voltage, the first voltage being at a higher potential than the second voltage, the pair of high speed diodes being adapted to clamp the one end of the resistance element to a voltage between the first and second voltages; and, (c) a triac structure having first and second terminals and a gate, the gate being connected to the one end of the first resistance element and the first terminal being connected to the other end of that resistance element, the second terminal of the triac structure being maintained at the second voltage;

whereby the pair of high speed diodes are sufficiently fast acting to clamp a surge propagating through the first resistance element to either the first or second voltage before the surge can adversely affect the interface circuit, and whereby the triac structure is sufficiently fast acting that a voltage differential created across the first resistance element by the surge places the triac structure into a conducting state for shunting the surge before the surge can adversely affect the pair of high speed diodes.

7. A fault protection circuit adapted to be positioned between a line and an interface circuit for preventing voltage or current surges on the line from adversely affecting the interface circuit, the fault protection circuit comprising:

(a) a first resistance element, one end of that resistance element being connected to the interface circuit and the other end being connected to the line;

(b) a pair of high speed diodes, one of the high speed diodes extending between the one end of the first resistance element and a first voltage, the other high speed diode extending between the one end of the resistance element and a second voltage, the first voltage being at a higher potential than the second voltage, the pair of high speed diodes being adapted to clamp the one end of the first resistance element to a voltage between the first and second voltages;

(c) a pair of second diodes, one of the second diodes extending between the one end of the first resistance element and the first voltage, the other second diode extending between the one end of the first resistance element and the second voltage, the pair of second diodes being adapted to clamp the one end of the first resistance element to a voltage between the first and second voltages; and, (d) a triac structure having first and second terminals and a gate, the gate being connected to the one end of the first resistance element and the first terminal being connected to the other end of that resistance element, the second terminal being maintained at the second voltage;

whereby the pair of high speed diodes are sufficiently fast acting to clamp a surge propagating through the first resistance element to either the first or second voltage before such surge can adversely affect the interface circuit, whereby the pair of second diodes are sufficiently fast acting to clamp the surge to either the first or second voltage before the surge can adversely affect the pair of high speed diodes, and whereby the triac structure is sufficiently fast acting that a voltage differential created across the first resistance element by the surge places the triac structure into a conducting state for shunting the surge before the surge can adversely affect the pair of second diodes.

8. A fault protection circuit as in claim 7, and also comprising a second resistance element serially positioned between the interface circuit and the first resistance element, wherein the pair of high speed diodes are connected to that end of the second resistance element which is connected to the interface circuit, and wherein the pair of second diodes are connected to the other end of the second resistance element.

9. A fault protection circuit as in claim 8, wherein each of the first and second resistance elements is a resistor having a resistance of approximately 3 ohms.

10. A fault protection circuit as in claim 6, 7 or 8, wherein each of the high speed diodes has a typical forward recovery time of approximately 4 nanoseconds.

11. A fault protection circuit as in claim 6, 7 or 8, wherein the triac structure is a triac having a typical holding current and gate trigger current of approximately 5 milliamperes and having a typical forward recovery time of approximately 100 nanoseconds.

12. A fault protection circuit as in claim 6, 7 or 8, wherein the first resistance element is a resistor having a resistance of approximately 3 ohms.

13. A fault protection circuit as in claim 1 or 8, wherein each of the pair of second diodes has a typical forward recovery time of approximately 1 microsecond.

14. A fault protection circuit as in claim 6 or 7, and also comprising an additional resistance element serially positioned between the first resistance element and the line, wherein the additional resistance element has a resistance of between approximately 50 and 200 ohms.

15. A fault protection circuit as in claim 1, 6 or 7, wherein the first voltage is nominally zero volts and the second voltage is nominally −48 volts, wherein the line is the tip line or the ring line of a pair of wires extending from a telephone to a switching station, and wherein the interface circuit is a circuit at the switching station.

* * * * *